United States Patent
Wang et al.

(10) Patent No.: US 12,034,298 B2
(45) Date of Patent: Jul. 9, 2024

(54) POWER SOURCE FOR AN AIRCRAFT

(71) Applicant: General Electric Company, Schenectady, NY (US)

(72) Inventors: Honggang Wang, Clifton Park, NY (US); Di Pan, Schenectady, NY (US); Kum Kang Huh, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 17/571,691

(22) Filed: Jan. 10, 2022

(65) Prior Publication Data

US 2023/0223752 A1    Jul. 13, 2023

(51) Int. Cl.
*H02J 1/10* (2006.01)
*B64D 41/00* (2006.01)
*F01D 15/10* (2006.01)

(52) U.S. Cl.
CPC .............. *H02J 1/106* (2020.01); *F01D 15/10* (2013.01); *B64D 2041/005* (2013.01); *B64D 2221/00* (2013.01); *F05D 2220/762* (2013.01); *F05D 2220/768* (2013.01); *H02J 2310/44* (2020.01)

(58) Field of Classification Search
None
See application file for complete search history.

(56) References Cited

U.S. PATENT DOCUMENTS

| | | |
|---|---|---|
| 3,658,279 A | 4/1972 | Robertson |
| 3,805,517 A | 4/1974 | Sewell et al. |
| 4,684,081 A | 8/1987 | Cronin |
| 5,227,256 A | 7/1993 | Marianowski et al. |
| 5,581,995 A | 12/1996 | Lucenko et al. |
| 5,858,314 A | 1/1999 | Hsu et al. |
| 5,968,680 A | 10/1999 | Wolfe et al. |
| 6,183,703 B1 | 2/2001 | Hsu et al. |
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |

(Continued)

FOREIGN PATENT DOCUMENTS

| | | |
|---|---|---|
| CN | 106976405 A | 7/2017 |
| DE | 102005012230 A1 | 10/2005 |

(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

(Continued)

*Primary Examiner* — Jared Fureman
*Assistant Examiner* — Joel Barnett
(74) *Attorney, Agent, or Firm* — Dority & Manning, P.A.

(57) ABSTRACT

An aircraft electrical system including: a first DC power bus and a fuel cell assembly including a first fuel cell group, wherein the first fuel cell group is electrically coupled directly to the first DC power bus without a voltage converter to provide a first power output to the first DC power bus.

21 Claims, 9 Drawing Sheets

(56) References Cited

U.S. PATENT DOCUMENTS

| | | |
|---|---|---|
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,967,984 B2 | 4/2021 | Willford et al. |
| 10,978,723 B2 | 4/2021 | Lo et al. |
| 2002/0163819 A1 | 11/2002 | Treece |
| 2004/0081871 A1 | 4/2004 | Kearl et al. |
| 2004/0150366 A1 | 8/2004 | Ferrall et al. |
| 2006/0010866 A1 | 1/2006 | Rehg et al. |
| 2008/0155984 A1 | 7/2008 | Liu et al. |
| 2010/0133475 A1 | 6/2010 | Kobayashi et al. |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2015/0364780 A1* | 12/2015 | Libis ................ H01M 8/04992 429/429 |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0141674 A1* | 5/2018 | Bailey ............... H01M 8/04201 |
| 2018/0141675 A1 | 5/2018 | Halsey et al. |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1 | 5/2019 | Shapiro et al. |
| 2019/0145273 A1 | 5/2019 | Frank et al. |
| 2019/0260226 A1* | 8/2019 | Lu ........................... H02J 1/106 |
| 2020/0014044 A1 | 1/2020 | Tichy et al. |
| 2020/0042062 A1* | 2/2020 | Astefanous ............. H02J 1/001 |
| 2020/0062414 A1 | 2/2020 | Hon et al. |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0313207 A1 | 10/2020 | Milcarek et al. |
| 2021/0003281 A1 | 1/2021 | Amble et al. |
| 2021/0075034 A1 | 3/2021 | Irie et al. |
| 2021/0115857 A1 | 4/2021 | Collopy |
| 2022/0055762 A1* | 2/2022 | Clarke .............. H01M 8/04029 |

FOREIGN PATENT DOCUMENTS

| | | |
|---|---|---|
| EP | 3805107 A1 | 4/2021 |
| JP | 2009187756 A | 8/2009 |
| JP | 2011002308 A | 1/2011 |
| JP | 2018087501 A | 6/2018 |
| KR | 20090064853 A | 6/2009 |
| WO | WO2018108962 A1 | 6/2018 |
| WO | WO2020/011380 A1 | 1/2020 |

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb51a8f713ca211b68&mc=true&node=pt14.1.33&rgn=div5#se 14.1.33_175.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.

(56) References Cited

OTHER PUBLICATIONS energy.gov/sites/prod/files/2014/03/f9/sofc_for_aircraft_pnnl_2012.pdf.

* cited by examiner

POWER SOURCE FOR AN AIRCRAFT

FIELD

An aircraft electrical system including: a first DC power bus and a fuel cell assembly. The fuel cell assembly including a first fuel cell group. The first fuel cell group is electrically coupled directly to the first DC power bus without a voltage converter to provide a first power output to the first DC power bus.

BACKGROUND

The electrical power on a jet aircraft is provided, regulated, and distributed by the aircraft electrical system. The electrical power on a jet aircraft is usually provided from the generator(s) on the gas turbine engines and batteries, and in certain cases, the Auxiliary Power Unit (APU) or during a power interruption, when all other power sources have failed, a Ram Air Turbine (RAT). A mix of pneumatic, hydraulic, and electrical power is provided through generator(s), a hydraulic pump and compressor in the gas turbine engines or APU system.

In conventional aircraft, electric, hydraulic, and pneumatic power outputs are all dependent on the efficiency and capabilities of the jet turbine engines and APU system. Other forms of harnessing electrical, hydraulic, and pneumatic energy could improve the efficiency of the overall system in an aircraft.

A proton exchange membrane fuel cell (PEMFC) and a solid oxide fuel cell (SOFC) provide direct current (DC) electrical power from a chemical process. SOFC-GT is a SOFC/gas turbine engine hybrid where the unreacted byproducts from the SOFC such as oxygen and hydrogen can be utilized to condition the air used by the SOFC and increase the efficiency of the entire system to which it is electrically coupled.

Great portions of an aircraft's systems have been electrified resulting in an increase on the proportion of electrically driven loads replacing the traditional pneumatic or hydraulic loads. Traditionally, the engine driven electric machine has been the primary power source in the aircraft. Modern aircraft with increased aircraft electric loads within both the engine nacelle and the fuselage, require more distributed power sources to provide higher efficiency, reliability, and operational flexibility.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
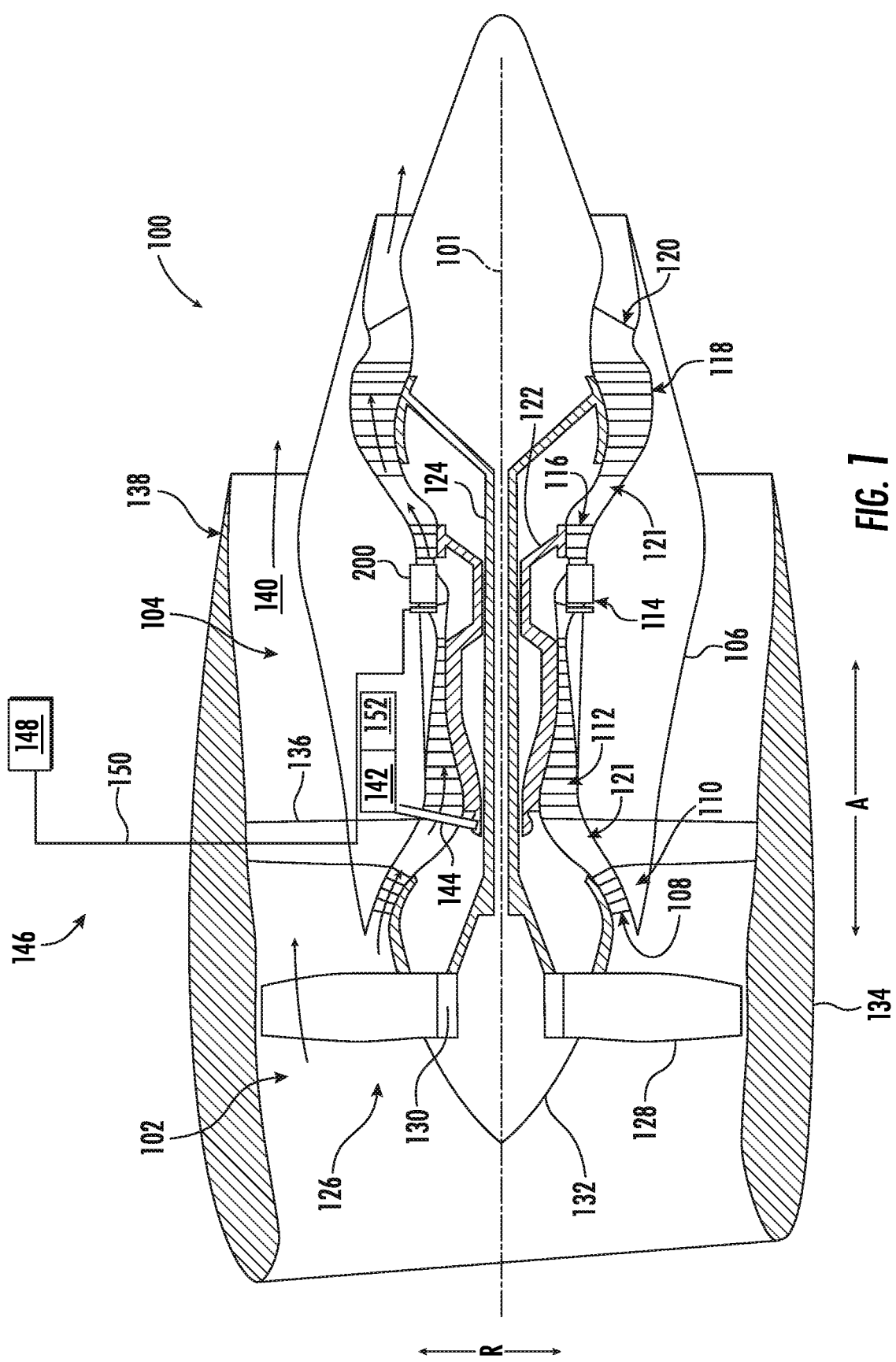
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

An aircraft electrical system is provided. The aircraft electrical system includes a first DC power bus and a fuel cell assembly. The fuel cell assembly includes a first fuel cell group. The first fuel cell group is electrically coupled directly to the first DC power bus without a voltage converter to provide a first power output to the first DC power bus.

A power source for an aircraft propulsion system with an engine, such as a gas turbine engine, having one or more accessory systems is provided. The power source includes a power bus defining a designed power load and a fuel cell assembly configured to be integrated into the engine. The power bus is configured to be electrically coupled to the one or more accessory systems for providing electrical power to the one or more accessory systems when integrated into the engine. The fuel cell assembly including a fuel cell group electrically coupled to the power bus and configured to provide a power output. The power output is within an operability range of the designed power load.

A power source for an aircraft propulsion system with an engine, such as a gas turbine engine is provided. The power source includes a first power bus; a second power bus; and a fuel cell assembly configured to be integrated into the engine. The fuel cell assembly includes a first fuel cell group; and a second fuel cell group. During at least a first operating condition of the power source, the fuel cell assembly is configured to provide a first power bus output from the first fuel cell group, the second fuel cell group, or both to the first power bus and is further configured to provide a second power bus output to the second power bus, the second power bus output being different than the first power bus output. In such a manner, the first and second fuel cell groups may provide power to different power sinks needing different amount and/or types of electrical power. For example, such a fuel cell assembly may allow for electrical power to be provided to the gas turbine engine at a power output designed for accessory systems of the gas turbine engine, and for electrical power to be provided to the aircraft at a power output designed for accessory systems of the aircraft. Such may result in a more efficient system, necessitating less hardware for power conversions, etc.

In another exemplary aspect of the present disclosure, an aircraft power source assembly is provided. The power source assembly including a gas turbine engine comprising one or more accessory systems and a power source. The power source includes a power bus integrated into the gas turbine engine and defining a designed power load and a fuel cell assembly integrated into the gas turbine engine. The power bus is electrically coupled to the one or more accessory systems for providing electrical power to the one or more accessory systems. The fuel cell assembly includes a fuel cell group electrically coupled to the power bus and configured to provide a power output, wherein the power output is within an operability range of the designed power load.

For example, the power source for an aircraft of the present disclosure may provide an additional power source for the aircraft to produce electrical power and provide increased flexibility in choice of power source for operation of the aircraft. The power source of the present disclosure may augment previously employed power sources. Moreover, the power source of the present disclosure may itself be configured to provide power output redundancy. As described below in more detail, the inventive power source may include a plurality of discrete fuel cell groups and each of which providing a power output that may be selectively coupled to more than one power bus, as required by aircraft and gas turbine engine operation. Thus, numerous aircraft systems may rely on more than one of the fuel cell groups based on need or on the failure of one of the fuel cell groups. In essence, the fuel cell groups may be configured as backups for each other and for other aircraft power sources.

In addition, the power source of the present disclosure may be configured to match the power output to the required load. Thus, the power source of the present disclosure may provide a DC power output with the required voltage for the load, potentially eliminating the need for a power converter. This results in an increase efficiency in terms of wiring and weight.

Moreover, the power bus defines a designed power load for the one or more accessory systems coupled thereto. The designed power load is the combined load required by the one or more accessory systems at an operating condition of the gas turbine engine. The designed power load may be dependent on the present requirements of the gas turbine engine at different times during operation. For example, the designed power load at engine startup will differ from the designed power load during flight or engine shut down. The designed power load may be dependent on the particular accessory systems in use and the nature of their use at a particular time. In view of the forgoing, the designed power load defined by the bus may have an operability range.

The operability range of the designed power load may be the range of power loads expected during operation of the gas turbine engine. For example, the operability range of the designed power load may span from the expected minimum designed load to the expected maximum designed load. Moreover, the operability range of the designed power load may span from a low below the minimum expected designed power load to a double the expected maximum designed load to allow for additional load in extraordinary engine operations.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. To improve system efficiency and fuel utilization and reduce external water usage, the fuel cell system may include an anode recirculation loop. As a single fuel cell can only generate about 1V voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the turbofan engine 100 additionally includes an accessory gearbox 142 and a fuel delivery system 146. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the turbofan engine 100 during at least certain operations and may further provide power back to the turbofan engine 100 during other operations. For example, the accessory gearbox 142 is, for the embodiment depicted, coupled to a starter motor/generator 152. The starter motor/generator may be configured to extract power from the accessory gearbox 142 and turbofan engine 100 during certain operation to generate electrical power and may provide power back to the accessory gearbox 142 and turbofan engine 100 (e.g., to the HP shaft 122) during other operations to add mechanical work back to the turbofan engine 100 (e.g., for starting the turbofan engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the turbofan engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
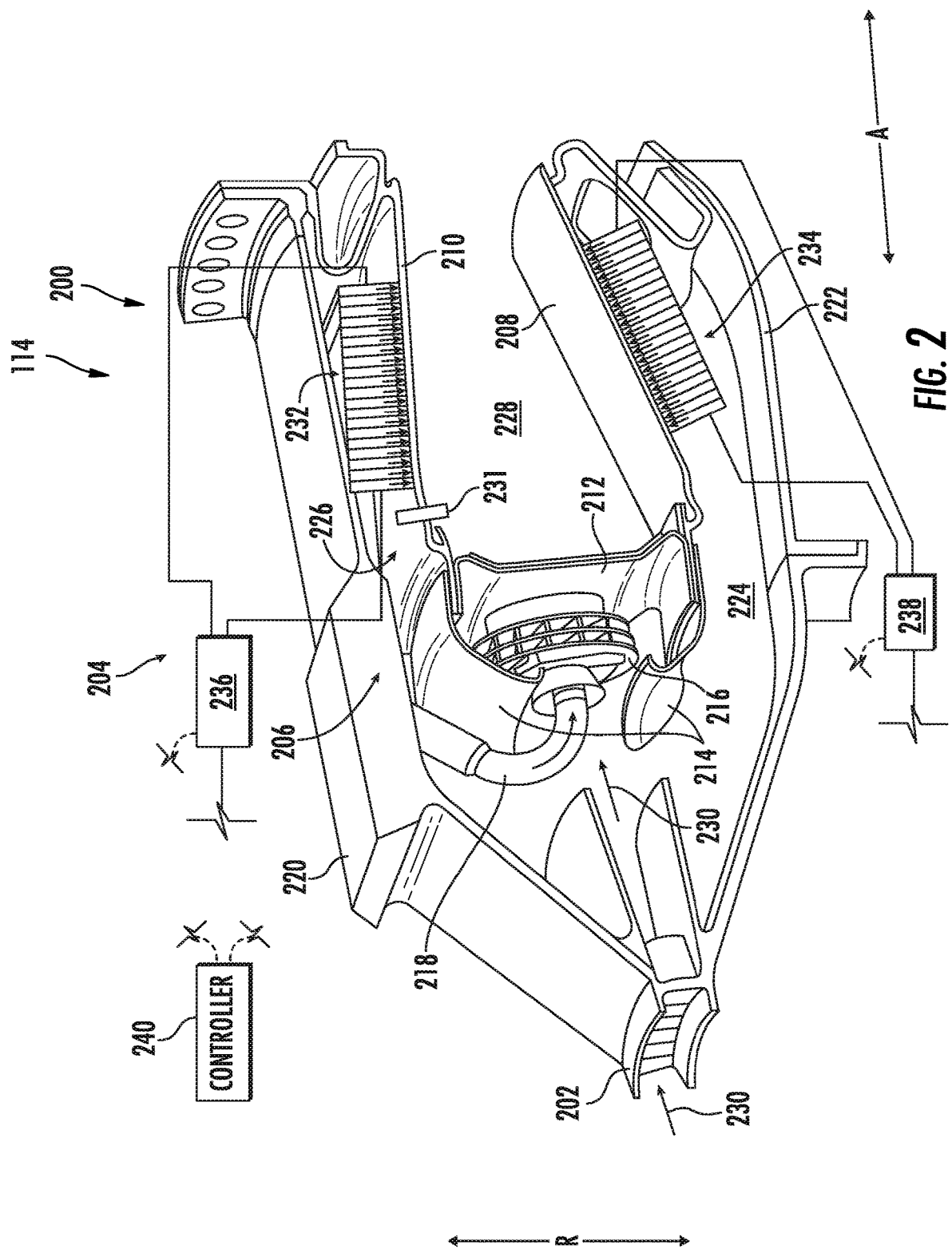
FIG. 2 is a perspective view of an integrated fuel cell and combustor assembly in accordance with the present disclosure.

Referring now to FIG. 2, FIG. 2 illustrates schematically a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the controller 240 described below with reference to FIG. 5.

Figure 3:
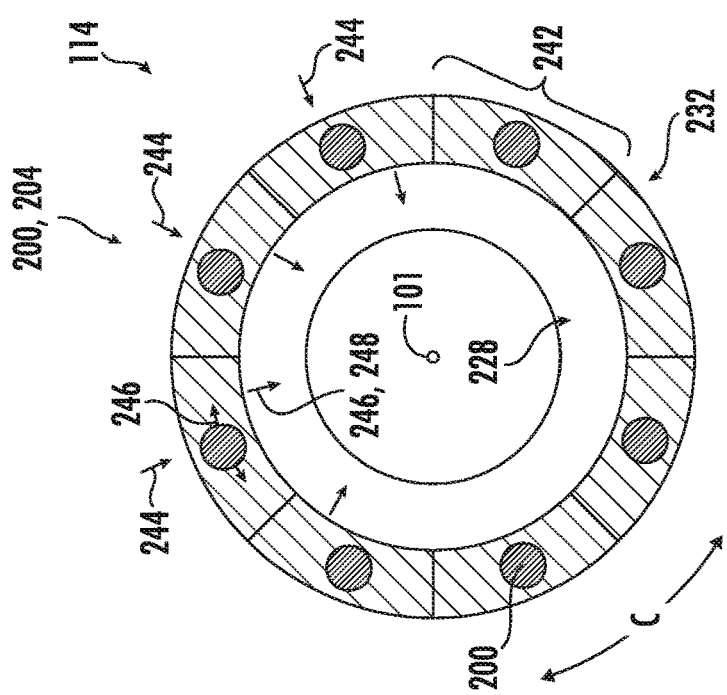
FIG. 3 is a schematic, axial view of the exemplary integrated fuel cell and combustor assembly of FIG. 2.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gasses that are directed downstream into the turbine section to drive or assist with driving the one or more turbines therein.

Figure 4:
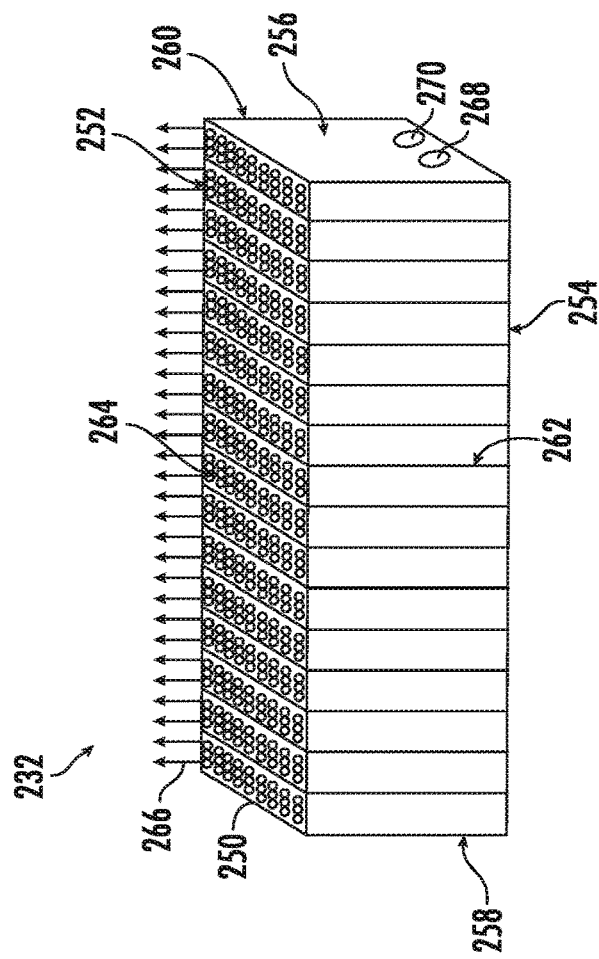
FIG. 4 is a schematic view of a fuel cell of a fuel cell assembly in accordance with an exemplary aspect of the present disclosure as may be incorporated into the exemplary integrated fuel cell and combustor assembly of FIG. 2.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258, and the side 254 are not visible in the perspective view of FIG. 4.

As will be appreciated, the first fuel cell stack 232 may include a plurality of fuel cells that are "stacked," e.g., side-by-side from one end of the first fuel cell stack 232 (e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as "output products") is directed from the combustion outlets 264 out of the housing 250. As described herein, the combustion gas 266 is generated using fuel and air that is not consumed by the fuel cells inside the housing 250 of the first fuel cell stack 232. The combustion gas 266 is provided to the combustion chamber 228 and burned during operation to generate combustion gasses used to generate thrust for the gas turbine engine 100 (and vehicle/aircraft incorporating the gas turbine engine 100).

The fuel and air inlet side 256 includes one or more fuel inlets 268 and one or more air inlets 270. Optionally, one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below. Each of the one or more air inlets 270 is fluidly coupled with a source of air for the fuel cells, such as air that is discharged from a compressor section and/or an air processing unit as is also described further below. The one or more inlets 268, 270 separately receive the fuel and air from the external sources of fuel and air, and separately direct the fuel and air into the fuel cells.

In certain exemplary embodiments, the first fuel cell stack 232 of FIGS. 2 through 4 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety. It will further be appreciated that the second fuel cell stack 234 of FIG. 2 may be configured in a similar manner as the first fuel cell stack 232, or alternatively may be configured in any other suitable manner.

It will be appreciated that, fuel cell assembly 204 of the present disclosure is divided into a plurality of fuel cell groups, with each fuel cell group capable of producing a discrete power output. As used herein, the term "group" as it relates to a fuel cell group of a fuel cell assembly refers to a plurality of fuel cells joined in a manner that may allow for electrical power to be outputted by the plurality of fuel cells separately from any other fuel cells of the fuel cell assembly during at least certain operations. For example, in the embodiment of FIG. 2, the first fuel cell stack 232 may be a first fuel cell group and the second fuel cell stack 234 may be a second fuel cell group. Alternatively, however, the fuel cell assembly 204 may include a plurality of fuel cell groups arranged along a length of the outer liner 210 along the axial direction A, a plurality of fuel cell groups arranged circumferentially along the outer liner 210 along the circumferential direction C, or a combination thereof. Separate power cables may be provided for each fuel cell group.

Further, it will be appreciated that although the exemplary fuel cell assembly 204 of FIGS. 2 through 4 generally includes the fuel cells, e.g., the fuel cells of the first fuel cell stack 232 and the second fuel cell stack 234, arranged along and integrated with the outer and inner liners 210, 208 of the combustor 206, in other embodiments, the fuel cell assembly 204 may be configured in any other suitable manner, in any other suitable location (e.g., axially forward of the combustor 206, spaced outward of the combustor 206 along the radial direction R, etc.). Further, in other embodiments, the fuel cell assembly 204 may use a chemistry other than solid oxide chemistry.

Figure 5:
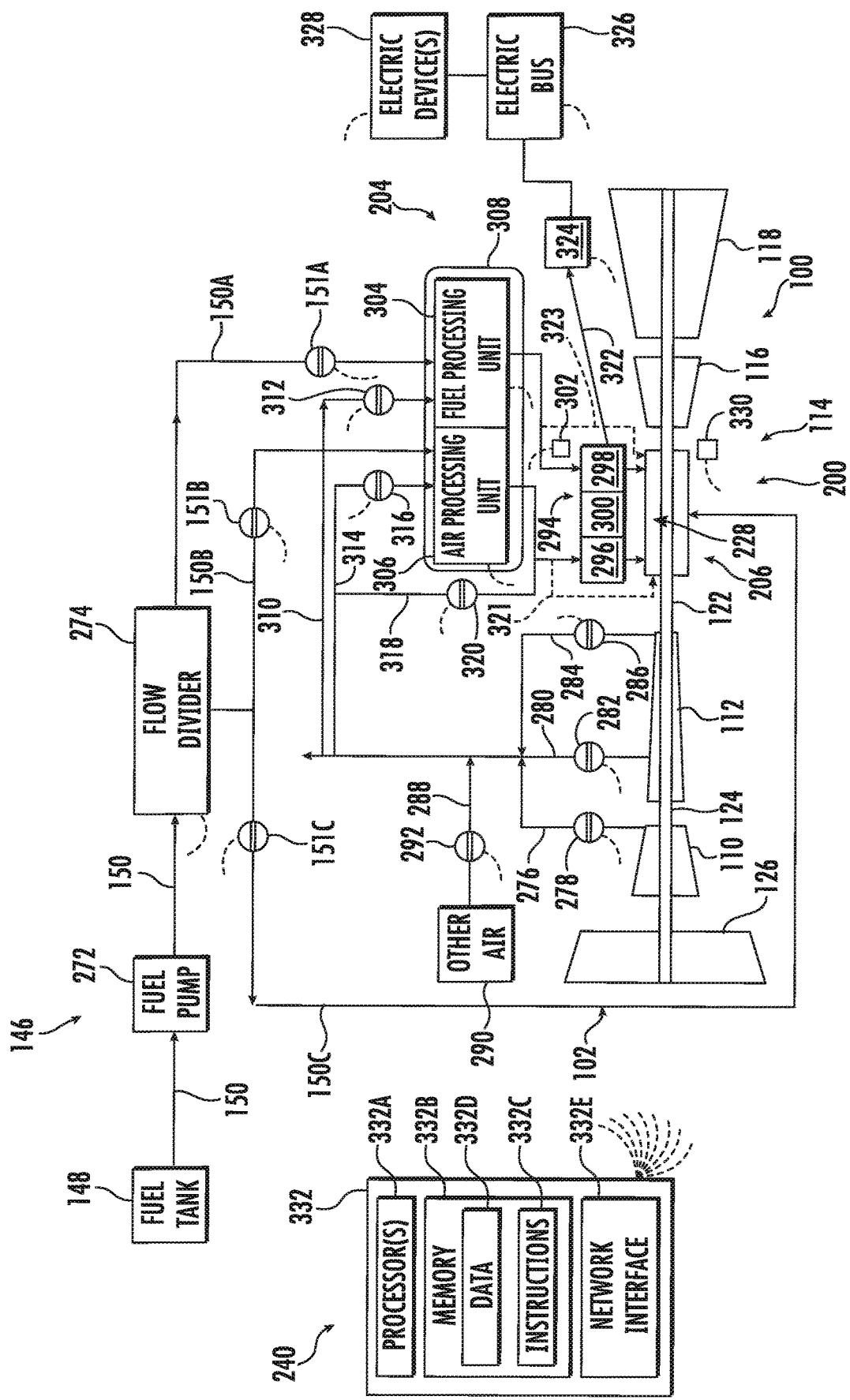
FIG. 5 is a schematic diagram of a gas turbine engine including an integrated fuel cell and combustor assembly in accordance with an exemplary aspect of the present disclosure.

Referring now to FIG. 5, operation of an integrated fuel cell and combustor assembly 200 in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296, an anode side 298, and an electrolyte 300 positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell).

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electric devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell (such as the fuel cell stack 294) may be composed of a nickel/yttria-stabilized zirconia (Ni/YSZ) cermet. Nickel in the anode side serves as a catalyst for fuel oxidation and current conductor. During normal operation of the fuel cell stack 294, the operating temperature may be greater than or equal to about 700° C., and the nickel (Ni) in the anode remains in its reduced form due to the continuous supply of primarily hydrogen fuel gas.

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of a combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor (CPOx) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 294.

It should be appreciated, however, that the fuel processing unit 304 may additionally or alternatively include any suitable type of fuel reformer, such as an autothermal reformer and steam reformer that may need an additional stream of steam inlet with higher hydrogen composition at the reformer outlet stream. Additionally, or alternatively, still, the fuel processing unit 304 may include a reformer integrated with the fuel cell stack 294. Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into a cathode 552 of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell 294 to allow a portion or all of an airflow conditioned by the air processing unit 306 (and combined with any bypass air through duct 318) to bypass the cathode side 296 of the fuel cell 294 and go directly to the combustion chamber 228. The airflow bypass duct 321 may be in thermal communication with the fuel cell 294. The fuel cell assembly further includes a fuel bypass duct 323 extending around the fuel cell 294 to allow a portion or all of a reformed fuel from the fuel processing unit 304 to bypass the anode side 298 of the fuel cell 294 and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be adapted to draw an electric current from, or apply an electrical load to, the fuel cell stack 294. Electrical devices, such as one or more of electrical devices 328, that are adapted to draw an electric current from an electric source may generally be referred to as an electrical load. The one or more additional electrical devices 328 may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 5, the gas turbine engine 100 further includes a sensor 330. In the embodiment shown, the sensor 330 is configured to sense data indicative of a flame within the combustion section 114 of the gas turbine engine 100. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to the various sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system, as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the gas turbine engine 100, the exemplary fuel delivery system 146, the exemplary integrated fuel cell and combustor assembly 200, and the exemplary fuel cell assembly 204 are provided by way of example only. In other embodiments, the integrated fuel cell and combustor assembly 200 and fuel cell assembly 204 may have any other suitable configuration. For example, in other exemplary embodiments, the fuel cell assembly 204 may include any other suitable fuel processing unit 304. Additionally, or alternatively, the fuel cell assembly 204 may not require a fuel processing unit 304, e.g., when the combustor of the gas turbine engine 100 is configured to burn hydrogen fuel and the fuel delivery assembly 146 is configured to provide hydrogen fuel to the integrated fuel cell and combustor assembly 200, and in particular to the fuel cell assembly 204.

Figure 6:
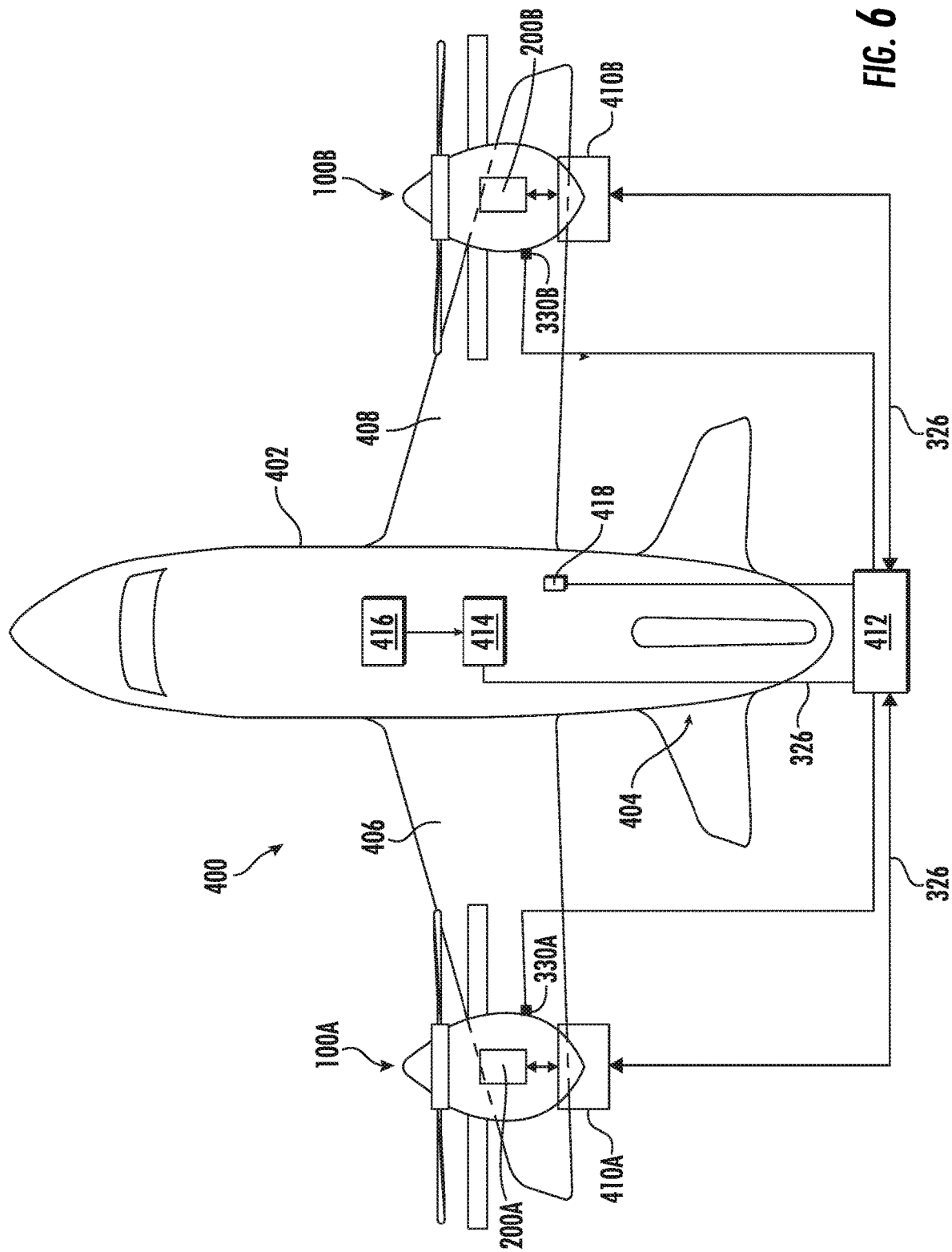
FIG. 6 is a schematic view of a vehicle and propulsion system in accordance with an exemplary aspect of the present disclosure.

As briefly mentioned above, the fuel cell assembly 204 may be in electrical communication with the electric bus 326, which may be an electric bus of the gas turbine engine 100, of an aircraft, or a combination thereof. Referring now briefly to FIG. 6, a schematic view is provided of an aircraft 400 in accordance with an embodiment of the present disclosure including one or more gas turbine engines 100 (labeled 100A and 100B), each with an integrated fuel cell and combustor assembly 200 (labeled 200A and 200B), and an aircraft electric bus 326 in electrical communication with the one or more gas turbine engines 100.

In particular, for the exemplary embodiment depicted, the aircraft 400 is provided including a fuselage 402, an empennage 404, a first wing 406, a second wing 408, and a propulsion system. The propulsion system generally includes a first gas turbine engine 100A coupled to, or integrated with, the first wing 406 and a second gas turbine engine 100B coupled to, or integrated with, the second wing 408. It will be appreciated, however, that in other embodiments, any other suitable number and or configuration of gas turbine engines 100 may be provided (e.g., fuselage-mounted, empennage-mounted, etc.).

The first gas turbine engine 100A generally includes a first integrated fuel cell and combustor assembly 200A and a first electric machine 410A. The first integrated fuel cell and combustor assembly 200A may generally include a first fuel cell assembly. The first electric machine 410A may be an embedded electric machine, an offset electric machine (e.g., rotatable with the gas turbine engine 100 through an accessory gearbox or suitable geartrain), etc. For example, in certain exemplary embodiments, the first electric machine 410A may be a starter motor/generator for the first gas turbine engine 100A.

Similarly, the second gas turbine engine 100B generally includes a second integrated fuel cell and combustor assembly 200B and a second electric machine 410B. The second integrated fuel cell and combustor assembly 200B may generally include a second fuel cell assembly. The second electric machine 410B may also be an embedded electric machine, an offset electric machine (e.g., rotatable with the gas turbine engine 100 through an accessory gearbox or suitable geartrain), etc. For example, in certain exemplary embodiments, the second electric machine 410B may be a starter motor/generator for the second gas turbine engine 100B.

In the embodiment of FIG. 6, the aircraft 400 additionally includes the electric bus 326 and a supervisory controller 412. Further, it will be appreciated that the aircraft 400 and/or propulsion system includes one or more electric devices 414 and an electric energy storage unit 416, each in electric communication with the electric bus 326. The electric devices 414 may represent one or more aircraft power loads (e.g., avionics systems, control systems, electric propulsors, etc.), one or more electric power sources (e.g., an auxiliary power unit), etc. The electric energy storage unit 416 may be, e.g., a battery pack or the like for storing electric power.

The electric bus 326 further electrically connects to the first electric machine 410A and first fuel cell assembly, as well as to the second electric machine 410B and second fuel cell assembly. The supervisory controller 412 may be configured in a similar manner as the controller 240 of FIG. 5 or may be in operative communication with a first gas turbine engine controller dedicated to the first gas turbine engine 100A and a second gas turbine engine controller dedicated to the second gas turbine engine 100n.

In such a manner, it will be appreciated that the supervisory controller 412 may be configured to receive data from a gas turbine engine sensor 330A of the first gas turbine engine 100A and from a gas turbine engine sensor 330B of the second gas turbine engine 100B and may further be configured to send data (e.g., commands) to various control elements (such as valves) of the first and second gas turbine engines 100A, 100B.

Moreover, it will be appreciated that for the embodiment depicted, the aircraft 400 includes one or more aircraft sensor(s) 418 configured to sense data indicative of various flight operations of the aircraft 400, including, e.g., altitude, ambient temperature, ambient pressure, airflow speed, etc. The supervisory controller 412 is operably connected to these aircraft sensor(s) 418 to receive data from such aircraft sensor(s) 418.

In addition to receiving data from sensors 330A, 330B, 418 and sending data to control elements, the supervisory controller 412 is configured to control a flow of electric power through the electric bus 326. For example, the supervisory controller 412 may be configured to command and receive a desired power extraction from one or more of the electric machines (e.g., the first electric machine 410A and second electric machine 410B), one or more of the fuel cell assemblies (e.g., the first fuel cell assembly and second fuel cell assembly), or both, and provide all or a portion of the extracted electric power to other of the one or more of the electric machines (e.g., the first electric machine 410A and second electric machine 410B), one or more of the fuel cell assemblies (e.g., the first fuel cell assembly and second fuel cell assembly), or both. One or more of these actions may be taken in accordance with the logic outlined below.

In one embodiment, fuel cell assembly 204 of each integrated fuel cell and combustor assembly 200 (labeled 200A and 200B; see also FIGS. 2 through 5) is divided into a plurality of fuel cell groups, with each fuel cell group producing a discrete power output. For example, the first fuel cell stack 232 may be configured as a first fuel cell group with a first power output and the second fuel cell stack 234 may be configured as a second fuel cell group with a second power output. The first and second fuel cell groups may be arranged on the outer and inner liners 210, 208 of the combustor 206 (as in FIG. 2), may be arranged axially along one of the outer or inner liners 210, 208 of the combustor 206, may be arranged circumferentially along one or both of the outer or inner liners 210, 208 of the combustor 206, or may be arranged in any other suitable manner. Further, in other embodiments, the fuel cell assembly 204 may include more than two groups (e.g., 3, 4, 5, or more groups, such as up to 20 groups).

Figure 7:
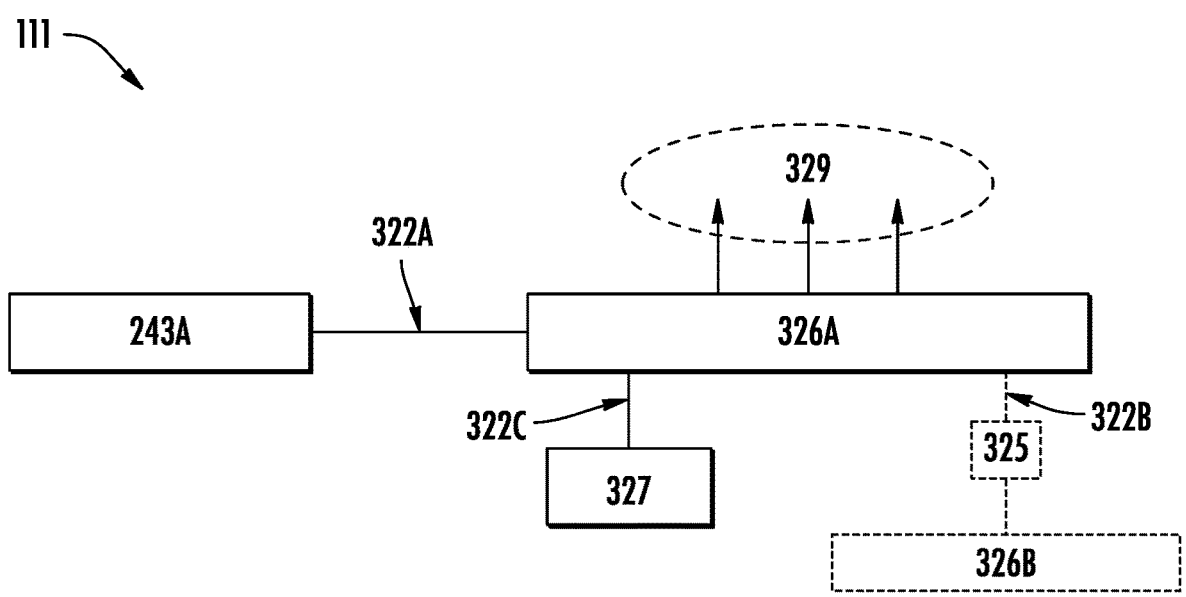
FIG. 7 is a schematic diagram of an aircraft electrical system in accordance with an exemplary aspect of the present disclosure.

Referring now to FIG. 7, a power source 111 is provided including first power bus 326A and a fuel cell assembly (not shown) associated with a gas turbine engine (not shown). The first power bus 326A is electrically coupled to one or more accessory systems 329 for providing electrical power to the one or more accessory systems 329. The one or more accessory systems 329 may be integrated into the engine or may be located in any other part of the aircraft. The one or more accessory systems 329 may be adapted to draw a current from a power source, and therefore may be referred to as an electrical load. In this embodiment, the one or more accessory systems are independently selected from the group including an engine control unit, a deicing system, a starter, a compressor, a pump, a motor, and a combination thereof.

The fuel cell assembly may be configured in a similar manner as the exemplary fuel cell assembly 204 of FIGS. 2 through 5, and the gas turbine engine may be configured in a similar manner as the exemplary gas turbine engine 100 of FIG. 1.

The fuel cell assembly includes a fuel cell group 243A. The fuel cell group 243A is electrically coupled to the first power bus 326A and configured to provide a first power output 322A. During operation of the power source 111 the first power bus 326A defines a designed power load with an operability range based on operational state of the one or more accessory systems 329. The fuel cell assembly is configured to provide the first power output 322A within the operability range of the designed power load.

In certain embodiments of the present disclosure, the first power bus 326A may be an AC power bus or a DC power bus, as desired. Moreover, the fuel cell group 243A may be electrically coupled to the first power bus 326A either directly (i.e., without a power converter) or with a DC/AC power converter or a DC/DC power converter (not shown), as may be required. The converter 325 may be a full power converter or a partial power converter (as described in U.S. Pat. No. 9,809,119 (which is incorporated herein by this reference)).

However, in the exemplary embodiment depicted, the first power bus 326A is a DC power bus directly electrically coupled to the fuel cell group 243A without a power converter and the first power output 322A has a voltage sized to match a load required by the first power bus 326A without the use of a DC/DC power converter. In such a manner, it will be appreciated that for the exemplary embodiment depicted, the fuel cell assembly 204 is configured to provide electrical power to the one or more accessory systems 329 (through the first power bus 326A) without flowing such electrical power through any intervening power electronics configured to modify such electrical power.

In the embodiment of FIG. 7, the power source 111 may also include a second power bus 326B electrically coupled to the first power bus 326A, the first power bus 326A providing a second power output 322B to the second power bus 326B. In certain embodiments of the present disclosure, the first power bus 326A may be an AC power bus or a DC power bus and the second power bus 326B may be an AC power bus or a DC power bus, as desired. Moreover, the second power bus 326B may be electrically coupled to the first power bus 326A either directly (i.e., without a power converter) or with a DC/AC power converter or a DC/DC power converter, as may be required.

More specifically, in the exemplary embodiment depicted, the second power bus 326B is a DC power bus and the first power bus 326A is a DC power bus and the two buses are electrically coupled with a DC/DC power converter 325. The second power bus 326B may also be in electrical communication with one or more accessory systems, such as one or more gas turbine engine accessory systems. With such a configuration, the first power bus 326A may be configured to provide electrical power to the one or more accessory systems 329 that allow for a greater fluctuation in the received electrical power (e.g., an accessory system having an electric pump or compressor), while the second power bus 326B may be configured to provide electric power to one or more accessory systems needing a more consistent electrical power (e.g., a controller or other computing system). Such may allow for at least a portion of the first power output 322A to be provided more efficiently to certain accessory systems.

With the embodiment of FIG. 7, the power source 111 may also include an alternative power source 327 electrically coupled to the first power bus 326A and providing a third power output 322C to the first power bus 326A. The alternative power source 327 may be permanent magnetic generator, an auxiliary power unit, an energy storage system, an additional fuel cell, a power output from another power bus, or a combination thereof. In certain embodiments of the present disclosure, the first power bus 326A may be an AC power bus or a DC power bus, as desired. Moreover, alternative power source 327 may provide an AC power output or a DC power output and may be electrically coupled to the first power bus 326A either directly (i.e., without a power converter) or with a DC/AC power converter or a DC/DC power converter (not shown), as may be required. However, in the exemplary embodiment depicted, the alternative power source 327 provides a DC power output 322C and first power bus 326A is a DC power bus directly electrically coupled to alternative power source 327 without a power converter.

Figure 8:
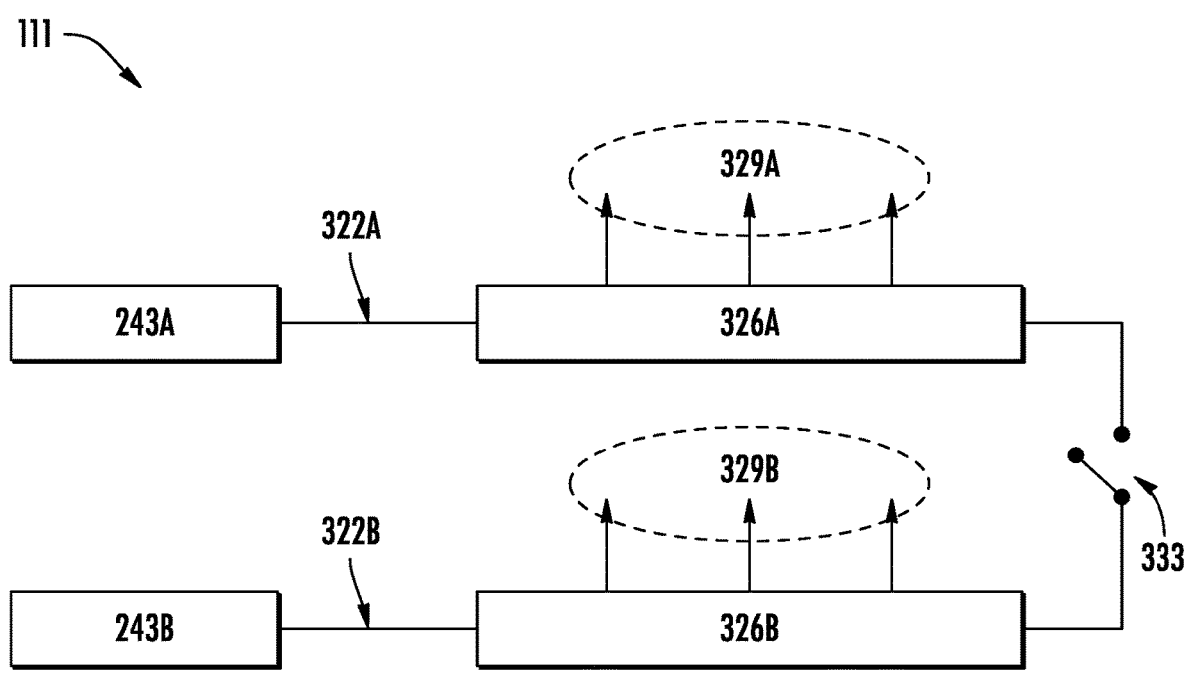
FIG. 8 is a schematic diagram of an aircraft electrical system in accordance with another exemplary aspect of the present disclosure.
Figure 9:
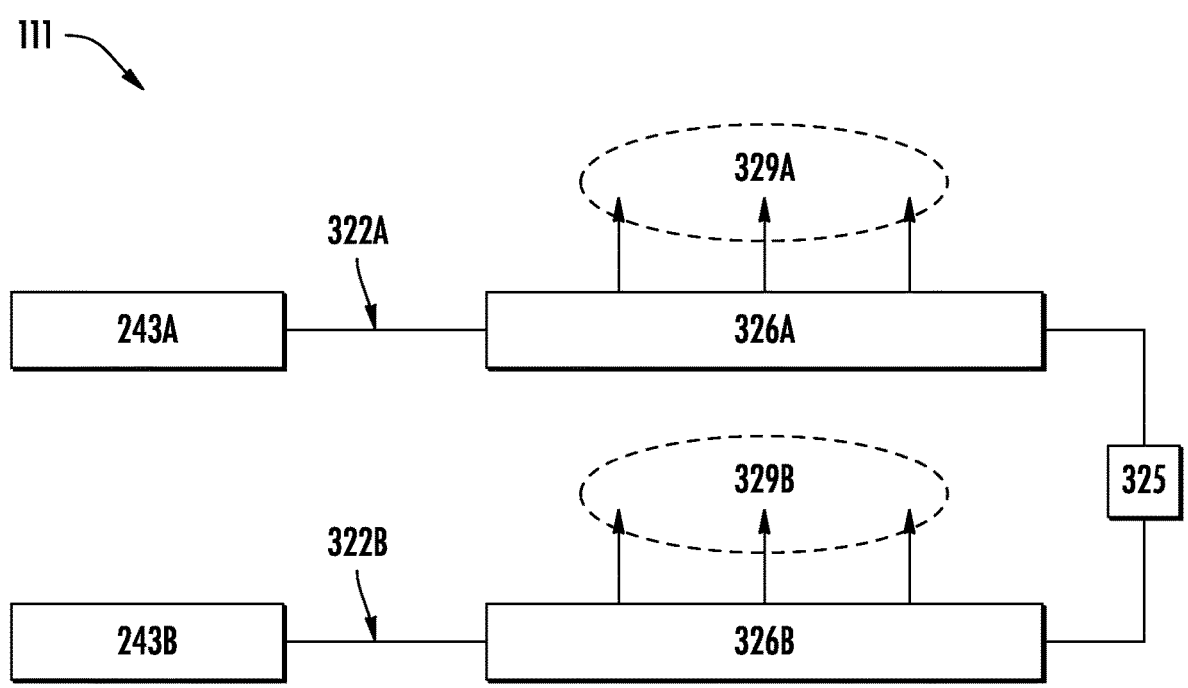
FIG. 9 is a schematic diagram of an aircraft electrical system in accordance with another exemplary aspect of the present disclosure.

Referring now to FIGS. 8 and 9, a power source 111 in accordance with another exemplary embodiment of the present disclosure is provided. The power source 111 of FIGS. 8 and 9 may be configured in a similar manner as the exemplary power source of FIG. 7. For example, the power source 111 of FIGS. 8 and 9 includes a first power bus 326A and a first fuel cell group 243A electrically coupled to the first power bus 326A and providing a first power output 322A. The first power bus 326A is electrically coupled to one or more first accessory systems 329A (e.g., electrical loads) for providing electrical power to the one or more first accessory systems 329A. In the embodiment of FIGS. 8 and 9, the power source 111 further includes a second power bus 326B and a second fuel cell group 243B electrically coupled to the second power bus 326B and providing a second power output 322B. The second power bus 326B is electrically coupled to one or more second accessory systems 329B (e.g., electrical loads) for providing electrical power to the one or more second accessory systems 329B. In the embodiments of FIGS. 8 and 9, the first power bus 326A and the second power bus 326B are electrically coupled to one another (as discussed in more detail below). In this embodiment, the one or more accessory systems 329A, 329B are independently selected from the group including an engine control unit, a deicing system, a starter, a compressor, a pump, a motor, and a combination thereof.

In certain embodiments of the present disclosure, the first power bus 326A may be an AC power bus or a DC power bus, as desired. Moreover, the first fuel cell group 243A may be electrically coupled to the first power bus 326A either directly (i.e., without a power converter) or with a DC/AC power converter or a DC/DC power converter 325, as may be required.

Likewise, in certain embodiments of the present disclosure, the second power bus 326B may be an AC power bus or a DC power bus, as desired. Thus, the second fuel cell group 243B may be electrically coupled to the second power bus 326B either directly (i.e., without a power converter) or with an DC/AC power converter or a DC/DC power converter (not shown), as required.

However, in the exemplary embodiment depicted, the first power bus 326A is a DC power bus directly electrically coupled to the first fuel cell group 243A without a power converter and the second power bus 326B is also a DC power bus directly electrically coupled to the second fuel cell group 243B without a power converter. With such a configuration, the first power output 322A has a voltage sized to match a load required by the first power bus 326A without the need for a power converter and the second power output 322B has a voltage sized to match a load required by the second power bus 326B without the need for a power converter. Such a configuration is similar to the embodiment of FIG. 7, discussed above.

As shown in FIG. 8, the first power bus 326A and second power bus 326B are more specifically selectively electrically coupled. Accordingly, during at least a first operating condition (when, e.g., a switch 333 is open) of the power source 111, the power source 111 is configured to provide the first power output 322A from the first fuel cell group 243A to the first power bus 326A and to provide the second power output 322B from the second fuel cell group 243B to the second power bus 326B. In this operating condition, the first power bus 326A provides power only to the first accessory systems 329A and the second power bus 326B provides power only to the second accessory systems 329B, or said another way, the first power bus 326A and second power bus 326B are electrically separated from one another such that they are not in electrical communication.

As will be appreciated, during at least a second operating condition (when, e.g., the switch 333 is closed) of the power source 111, the power source 111 is configured to provide the first power output 322A from the first fuel cell group 243A to the first power bus 326A and to provide the second power output 322B from the second fuel cell group 243B to the second power bus 326B. In this operating condition, the first power bus 326A may provide power to the second power bus 326B and the second power bus 326B may provide power to the first power bus 326A, as needed. This operating condition allows for power transfer from one bus to the other as the designed power loads of each power bus requires. Moreover, this operating condition allows for one of the two fuel cell groups 243A, 243B to provide power to both power buses 326A, 326B, e.g., exclusively in the case one of the fuel cell groups is offline or otherwise unable to produce a power output or a desired power output.

As shown in FIG. 9, the first power bus 326A and second power bus 326B may be electrically coupled through a power converter 325. As discussed above, in certain embodiments of the present disclosure, the first power bus 326A may be an AC power bus or a DC power bus, as desired, and the second power bus 326B may be an AC power bus or a DC power bus, as desired and the power converter 325 is an AC/DC converter or a DC/DC converted as needed.

In the embodiment of FIG. 9, the first power output 322A is different than the second power output 322B. For example, depending on the demands on the power source 111, the first power output 322A may be at a different voltage than the second power output 322B, may be at a different current than the second power output 322B, or both. For example, in at least certain exemplary embodiments, the first and second power outputs 322A, 322B may be at voltages having at least about a 10% difference (e.g., calculated by absolute value of: (voltage of first power output 322A−voltage of second power output 322B)/voltage of first power output 322A), such as at least about a 20% difference, such as at least about a 30% difference, such as at least about a 40% difference, such as at least about a 50% difference, such as at least about a 100% difference, such as up to about a 1000% difference. Additionally or alternatively, in at least certain exemplary embodiments, the first and second power outputs 322A, 322B may be at currents having at least about a 10% difference (e.g., calculated by absolute value of: (current of first power output 322A−current of second power output 322B)/current of first power output 322A), such as at least about a 20% difference, such as at least about a 30% difference, such as at least about a 40% difference, such as at least about a 50% difference, such as at least about a 100% difference, such as up to about a 1000% difference.

In other exemplary embodiments, the first power bus 326A is a DC power bus and the second power bus 326B is a DC power bus and the power converter 325 is a DC/DC power converter.

Figure 10:
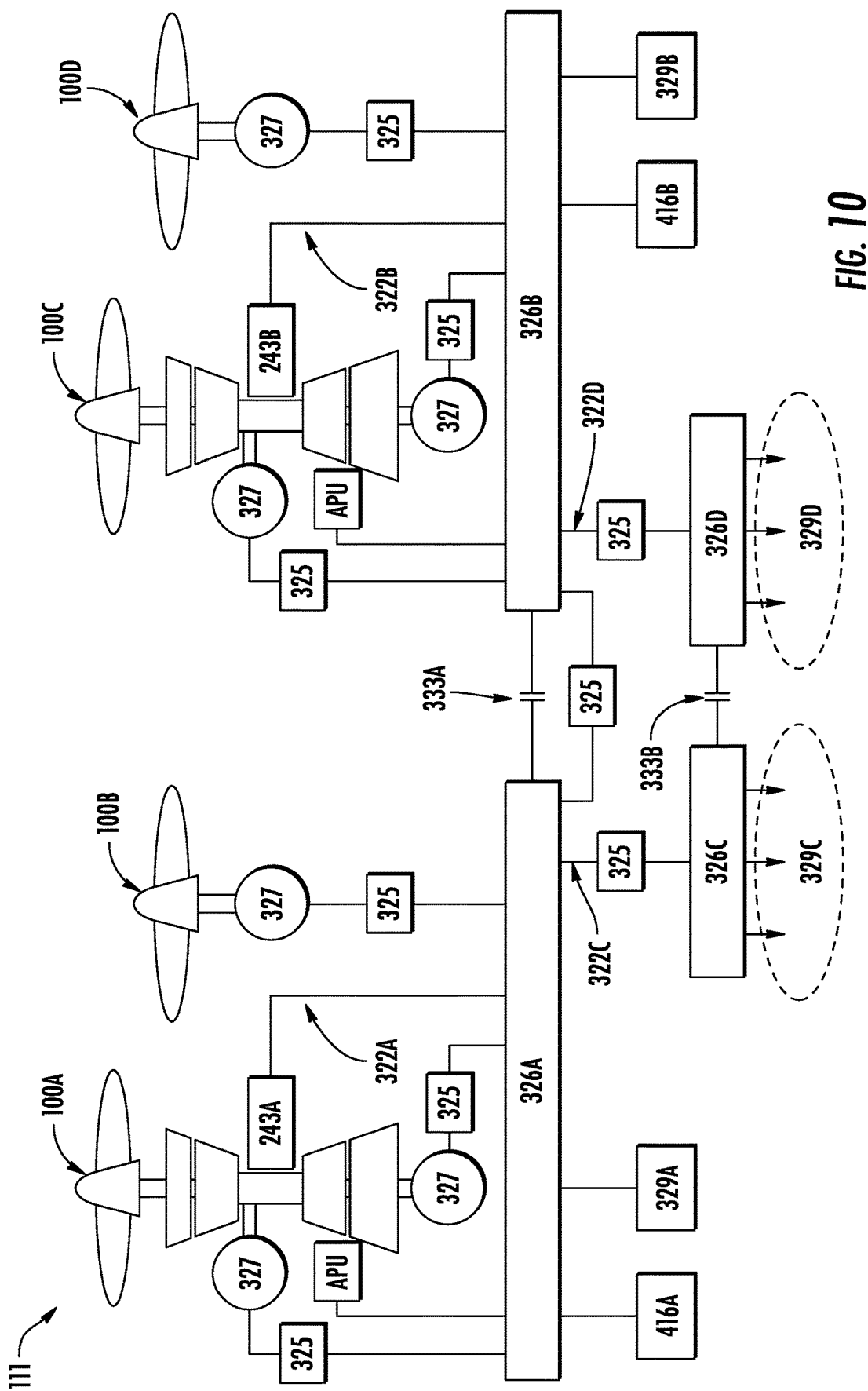
FIG. 10 is a schematic diagram of an aircraft electrical system in accordance with another exemplary aspect of the present disclosure.

In at least certain exemplary embodiments, the first and second fuel cell groups 243A, 243B may be part of the same fuel cell stack (see fuel cell stack 232 of FIG. 2). In other exemplary embodiments, the first and second fuel cell groups 243A, 243B may each be part of different fuel cell stacks, may be on different fuel cell assemblies (see fuel cell assemblies 204 of FIGS. 2-3), and may even be associated different engines (see engines 100A, 100B of FIGS. 6 and 10; FIG. 10 discussed in detail below).

In at least certain exemplary embodiments, the first and second fuel cell groups 243A, 243B may be structured to provide the different power outputs. For example, the first and second fuel cell groups 243A, 243B may include a different total number of fuel cells connected in series (see FIG. 4); may have different heights, widths, or both such that an electrolyte layer of the fuel cells define a different total surface area (see layer 300 of FIG. 5); may be structured to receive a different amount of fuel, air, or both; etc.

In such a manner, it will be appreciated that the first and second fuel cell groups 243A, 243B may provide their respective power outputs 322A, 322B to unique power sinks. For example, for the embodiment depicted the first power bus 326A distributes power to an aircraft external to the engine nacelle (see engine nacelle 134 of FIG. 1), and more particularly to an aircraft power bus electrically coupled to one or more aircraft accessory systems 329 external to the gas turbine engine 100 (e.g., electronic devices 414, see FIG. 6).

Referring now to FIG. 10, a power source 111 is depicted with four propulsion engines (100A-D). In particular, engines 100A, 100C are gas turbine engines (e.g., configured similarly to the exemplary gas turbine engine 100 of FIG. 1), and engines 100B, 100D are electric propulsion engines (e.g., electric propulsion fans).

This embodiment may considered be a more detailed depiction of exemplary version of the embodiments of FIGS. 7 through 9. In the embodiment of FIG. 10, the power source 111 includes a first power bus 326A and a second power bus 326B. A first fuel cell group 243A is part of a fuel cell assembly (not shown) of engine 100A. A second fuel cell group 243B is part of a fuel cell assembly (not shown) of engine 100B. The first fuel cell group 243A is electrically coupled to the first power bus 326A and the first fuel cell group 243A provides a first power output 322A to the first power bus 326A. Likewise, the second fuel cell group 243B is electrically coupled to the second power bus 326B and the second fuel cell group 243B provides a second power output 322B to the second power bus 326B. In an exemplary embodiment, the first and second fuel cell assemblies (not shown) are solid oxide fuel cell assemblies, and the gas turbine engines 100A, 100B include combustion sections in which fuel cells include an outlet positioned to provide output products from the fuel cell to the combustion section (see, e.g., FIGS. 2 through 5).

The first power bus 326A is electrically coupled to one or more first accessory systems 329A for providing electrical power to the one or more first accessory systems 329A. The second power bus 326B is electrically coupled to one or more second accessory systems 329B for providing electrical power to the one or more second accessory systems 329B.

In the embodiment of FIG. 10, the power source may also include a third power bus 326C and a fourth power bus 326D. The third power bus 326C may be electrically coupled to the first power bus 326A, the first power bus 326A providing a third power output 322C to the third power bus 326B. The fourth power bus 326D may be electrically coupled to the second power bus 326B, the second power bus 326B providing a fourth power output 322D to the fourth power bus 326D. The third power bus 326C is electrically coupled to one or more third accessory systems 329C for providing electrical power to the one or more third accessory systems 329C. The fourth power bus 326D is electrically coupled to one or more fourth accessory systems 329D for providing electrical power to the one or more first accessory systems 329D. In this embodiment, the one or more accessory systems 329C, 329D are independently selected from the group including an engine control unit, a deicing system, a starter, a compressor, a pump, a motor, and a combination thereof.

In this embodiment, the power source 111 further includes a first and a second energy storage system 416A, 416B. The first power bus 326A is also electrically coupled to the first energy storage system 416A, such as a battery, which can provide power to the first power bus 326A or be recharged through the first power bus 326A, as needed. The second power bus 326B is also electrically coupled to the second energy storage system 416B, such as a battery, which can provide power to the second power bus 326B or be recharged through the second power bus 326B, as needed.

Further, in certain exemplary embodiments, the power source 111 also includes one or more alternative power sources 327, and more specifically for the embodiment depicted includes one or more electric machines electrically coupled to the first power bus 326A or the second power bus 326B, as shown. For example, the power source 111 depicted includes a first, high pressure electric machine (depicted as one of the alternative power sources 327 of the engine 100A) coupled to the high pressure components of the engine 100A and a second, low pressure electric machine (depicted as the other of the alternative power sources 327 of the engine 100A) coupled to the low pressure components of the engine 100A. In the embodiment depicted, both the high pressure electric machine and the low pressure electric machine are electrically coupled to the first power bus 326A (through a respective power converter 325, such as an AC/DC power converter). Similar electric machines are provided with the engine 100C in the embodiment depicted (also depicted as alternative power sources 327).

In this embodiment, each of the four power buses 326A-D may (individually) be an AC power bus or a DC power bus. In addition, each of the power sources (i.e., fuel cell groups 243A, 243B, alternative power sources 327, auxiliary power units ("APU"), energy storage systems 416) may be a DC power source or an AC power source (excluding the fuel cell groups 243A, 243B). Thus, the electrical couplings between a power source and a power bus or between one power bus and another power bus may be direct (i.e., without a power converter). Alternatively, the electrical couplings between a power source and a power bus or between one power bus and another power bus may be through a power converted 325 (i.e., an AC/DC power converter or a DC/DC power converter, as appropriate).

More specifically, in the embodiment depicted, the first power bus 326A and second power bus 326B are each configured to receive unconditioned electric power from the first fuel cell group 243A and second fuel cell group 243B, respectively (e.g., directly, without use of any power electronics to modify the received electrical power). In such a manner, the first and second power busses 326A, 326B are unregulated power busses. Such may allow for the first and second power busses 326A, 326B to directly provide and distribute such electrical power to at least certain accessory systems in a more efficient manner. Further, for the embodiment depicted, it will be appreciated that the engines 100B and 100D are electrically coupled to the first and second power busses 326A, 326B, respectively. In such a manner, they are configured to receive electrical power from unregulated electrical busses, which may again allow for a more efficient transfer of electrical power.

By contrast, for the embodiment depicted, the third and fourth electric busses 326C, 326D receive power through a respective converter 325, such that the electric power through the third and fourth electric busses 326C, 326D is at a desired power level (e.g., voltage and current). In such a manner, the third and fourth electric busses 326C, 326D may be referred to as regulated power busses (e.g., voltage regulated DC power busses). With such a configuration, the first and second power busses 326A, 326B may be configured to provide electrical power to accessory systems having an ability to accept electrical power in a broader power range (e.g., a broader range of voltage and/or current), whereas the third and fourth electric busses 326C, 326D may be configured to provide electrical power to accessory systems having an ability to accept electrical power in a narrower power range (e.g., a narrower range of voltage and/or current). The breadth of the power range a particular accessory system may accept power refers to the range of electrical power that the accessory system may accept and still perform in a desired manner, may operate without a substantial acceleration of system degradation, or both.

In embodiments, the power source 111 may include one or more controllers (not shown) electrically coupled to the power buses 326A-D, the fuel cell groups 243A, 243B, the alternative power sources 327, the energy storage units 416, or a combination thereof to control allocation of power from the power buses 326A-D, the fuel cell groups 243A, 243B, the alternative power sources 327, the energy storage units 416A, 416B. The one or more controllers may be configured in a similar manner to the controller 240 of FIG. 2 or 5. In such a manner, it will further be appreciated that the one or more controllers may be configured to control one or more fuel cell operating conditions to, inter alia, modify the power outputs 322A-D.

As will further be appreciated, the power system includes a plurality of switches 333A, 333B to allow selective electrical coupling of the power buses. In particular, one embodiment includes a first switch 333A to selectively electrically connect the first power bus 326A to the second power bus 326B, and a second switch 333B to selectively electrically connect the third power bus 326C to the fourth power bus 326D. In embodiments, additional switches (not shown) may be present to allow selective electrical coupling between other of the power buses or between the power buses 326A-D and one or more of the fuel cell groups 243A, 243B, alternative power sources 327, and energy storage systems 416. The controller (not shown) may be operably connected to one or more of these switches 333 to selectively electrically connect the components in response to, e.g., various sensed data, control decisions, or the like.

Further aspects are provided by the subject matter of the following clauses:

An aircraft electrical system comprising: a first DC power bus; and a fuel cell assembly comprising a first fuel cell group, wherein the first fuel cell group is electrically coupled directly to the first DC power bus without a voltage converter to provide a first power output to the first DC power bus.

The aircraft electrical system of one or more of these clauses, further comprising a first electrical load, wherein the first DC power bus is electrically coupled to the first electrical load and provides power to the first electrical load.

The aircraft electrical system of one or more of these clauses, wherein the first electrical load is selected from a group including an engine control unit, a deicing system, a starter, a compressor, a pump, a motor, and combinations thereof.

The aircraft electrical system of one or more of these clauses, further comprising an alternative power source providing a second power output to the first DC power bus.

The aircraft electrical system of one or more of these clauses, wherein the alternative power source is a permanent magnetic generator, an auxiliary power unit, an energy storage system, an additional fuel cell, a power output from another power bus, or a combination thereof.

The aircraft electrical system of one or more of these clauses, further comprising a voltage converter, wherein the voltage converter is electrically coupled to the first DC power bus and is configured to electrically connect the first DC power bus to a second electrical load such that the first DC power bus is capable of providing power to the second electrical load, or is configured to electrically connect the first DC power bus to an alternative power source such that the alternative power source is capable of providing power to the first DC power bus.

The aircraft electrical system of one or more of these clauses, wherein the first DC power bus is electrically coupled through a voltage regulated DC power bus to the second electrical load or to the alternative power source.

The aircraft electrical system of one or more of these clauses, wherein the fuel cell assembly further comprises a second fuel cell group and a second DC power bus and wherein the second fuel cell group is electrically coupled directly to the second DC power bus without a voltage converter to provide a second power output to the second DC power bus.

The aircraft electrical system of one or more of these clauses, wherein the first DC power bus is electrically coupled to the second DC power bus through a voltage converter.

The aircraft electrical system of one or more of these clauses, wherein the voltage converter is a DC/DC power converter.

The aircraft electrical system of one or more of these clauses, wherein the first DC power bus is selectively and directly electrically coupled to the second DC power bus without a voltage converter.

The aircraft electrical system of one or more of these clauses, further comprising a controller electrically coupled to the fuel cell assembly and the DC power bus to regulate power allocation from the first and second fuel cell groups and the first and second DC power buses.

The aircraft electrical system of one or more of these clauses, wherein the fuel cell assembly is located in an engine, or in a fuselage of an aircraft, or in any other location within the aircraft.

The aircraft electrical system of one or more of these clauses, wherein the first fuel cell group comprises one or more fuel cells selected from the group consisting solid oxide fuel cells, polymer electrolyte membrane fuel cells, direct methanol fuel cells, alkaline fuel cells, phosphoric acid fuel cells, molten carbonate fuel cells, reversible fuel cells, and combinations thereof.

A power source for an aircraft having an engine, the engine having one or more accessory systems, the power source comprising: a power bus defining a designed power load, the power bus configured to be electrically coupled to the one or more accessory systems for providing electrical power to the one or more accessory systems when integrated into the engine; and a fuel cell assembly configured to be integrated into the engine, the fuel cell assembly comprising a fuel cell group electrically coupled to the power bus and configured to provide a power output, wherein the power output is within an operability range of the designed power load.

The power source of one or more of these clauses, wherein the power bus is a DC power bus and fuel cell group is directly electrically coupled to the power bus without a power converter and the power output has voltage sized to match a load required by the power bus without the use of a DC/DC power converter.

The power source of one or more of these clauses, wherein the fuel cell assembly is a solid oxide fuel cell assembly.

The power source of one or more of these clauses, wherein the engine is a gas turbine engine comprising a combustion section, wherein the fuel cell group comprises a fuel cell, wherein the fuel cell defines an outlet positioned to provide output products from the fuel cell to the combustion section.

The power source of one or more of these clauses, further comprising an alternative power source electrically coupled to the power bus and configured to provide a second power output.

The power source of one or more of these clauses, wherein the alternative power source is a permanent magnetic generator, an auxiliary power unit, an energy storage system, an additional fuel cell, a power output from another power bus, or a combination thereof.

The power source of one or more of these clauses, wherein the power bus is a first power bus, wherein the fuel cell group is a first fuel cell group, wherein the alternative power source is a power output from a second power bus, the second power bus electrically coupled to a second fuel cell group, the second fuel cell group configured to provide power to the second power bus.

The power source of one or more of these clauses, wherein the first power bus and the second power bus are selectively in direct electrical communications, selectively coupled without a power converter.

The power source of one or more of these clauses, wherein the first power bus and the second power bus are selectively in electrical communication with a power converter.

The power source of one or more of these clauses, wherein the second power output is an AC power output, and the alternative power source is electrically coupled to the first power bus with an AC/DC power converter.

The power source of one or more of these clauses, wherein the one or more accessory systems are independently selected from the group including an engine control unit, a deicing system, a starter, a compressor, a pump, a motor, and a combination thereof.

The power source of one or more of these clauses, wherein the power bus is a first power bus, wherein the fuel cell group is a first fuel cell group, and wherein the power source further comprises a second power bus, wherein the second power bus is a regulated power bus electrically coupled to the first power bus with a DC/DC power converter.

The power source of one or more of these clauses, wherein the power source is configured to distribute less than about 40% of a total electrical power provided to the first power bus to the regulated power bus.

An aircraft power source assembly comprising: a gas turbine engine comprising one or more accessory systems; and a power source comprising: a power bus integrated into the gas turbine engine and defining a designed power load, the power bus electrically coupled to the one or more accessory systems for providing electrical power to the one or more accessory systems when; and a fuel cell assembly integrated into the gas turbine engine, the fuel cell assembly comprising a fuel cell group electrically coupled to the power bus and configured to provide a power output, wherein the power output is within an operability range of the designed power load.

The power source of one or more of these clauses, wherein the power bus is a DC power bus, and wherein the fuel cell group is directly electrically coupled to the power bus without a power converter and the power output has voltage sized to match a load required by the power bus without use of a DC/DC power converter.

The power source of one or more of these clauses, wherein the fuel cell assembly comprises fuel cells selected from the group consisting solid oxide fuel cells, polymer electrolyte membrane fuel cells, direct methanol fuel cells, alkaline fuel cells, phosphoric acid fuel cells, molten carbonate fuel cells, reversible fuel cells, and combinations thereof.

The power source of one or more of these clauses, further comprising: an alternative power source electrically coupled to the power bus and configured to provide a second power output.

The power source of one or more of these clauses, wherein the power bus is a first power bus, wherein the fuel cell group is a first fuel cell group, wherein the alternative power source is a power output from a second power bus, the second power bus electrically coupled to a second fuel cell group, the second fuel cell group configured to provide power to the second power bus.

The power source of one or more of these clauses, wherein the first power bus and the second power bus are selectively in direct electrical communications, selectively coupled without a power converter.

The power source of one or more of these clauses, wherein the first power bus and the second power bus are selectively in electrical communication with a power converter.

We claim:

1. An aircraft electrical system comprising:
   a first DC power bus defining a designed power load, wherein the first DC power bus is configured to provide electrical power to one or more accessory systems of a gas turbine engine; and
   a fuel cell assembly configured to integrate into the gas turbine engine, the fuel cell assembly comprising a first fuel cell group, wherein the first fuel cell group is electrically coupled directly to the first DC power bus without a voltage converter to provide a first power output to the first DC power bus, wherein the first power output is within an operability range of the designed power load.

2. The aircraft electrical system of claim 1, further comprising a first electrical load, wherein the first DC power bus is electrically coupled to the first electrical load and provides power to the first electrical load.

3. The aircraft electrical system of claim 2, wherein the first electrical load is selected from a group including an engine control unit, a deicing system, a starter, a compressor, a pump, a motor, and combinations thereof.

4. The aircraft electrical system of claim 1, further comprising an alternative power source providing a second power output to the first DC power bus.

5. The aircraft electrical system of claim 4, wherein the alternative power source is a permanent magnetic generator, an auxiliary power unit, an energy storage system, an additional fuel cell, a power output from another power bus, or a combination thereof.

6. The aircraft electrical system of claim 1, further comprising a voltage converter, wherein the voltage converter is electrically coupled to the first DC power bus and is configured to electrically connect the first DC power bus to a second electrical load such that the first DC power bus is capable of providing power to the second electrical load, or is configured to electrically connect the first DC power bus to an alternative power source such that the alternative power source is capable of providing power to the first DC power bus.

7. The aircraft electrical system of claim 6, wherein the first DC power bus is electrically coupled through a voltage regulated DC power bus to the second electrical load or to the alternative power source.

8. The aircraft electrical system of claim 1, wherein the fuel cell assembly further comprises a second fuel cell group and a second DC power bus and wherein the second fuel cell group is electrically coupled directly to the second DC power bus without a voltage converter to provide a second power output to the second DC power bus.

9. The aircraft electrical system of claim 8, wherein the first DC power bus is electrically coupled to the second DC power bus through a voltage converter.

10. The aircraft electrical system of claim 9, wherein the voltage converter is a DC/DC power converter.

11. The aircraft electrical system of claim 8, wherein the first DC power bus is selectively and directly electrically coupled to the second DC power bus without a voltage converter.

12. The aircraft electrical system of claim 8, further comprising a controller electrically coupled to the fuel cell assembly, the first and second DC power buses to regulate power allocation from the first and second fuel cell groups and the first and second DC power buses.

13. The aircraft electrical system of claim 1, wherein the fuel cell assembly is located in an engine, or in a fuselage of an aircraft, or in any other location within the aircraft.

14. The aircraft electrical system of claim 1, wherein the first fuel cell group comprises one or more fuel cells selected from the group consisting of solid oxide fuel cells, polymer electrolyte membrane fuel cells, direct methanol fuel cells, alkaline fuel cells, phosphoric acid fuel cells, molten carbonate fuel cells, reversible fuel cells, and combinations thereof.

15. An aircraft power source assembly comprising:
a gas turbine engine comprising one or more accessory systems; and
an aircraft electrical system comprising:
a power bus integrated into the gas turbine engine and defining a designed power load, the power bus electrically coupled to the one or more accessory systems for providing electrical power to the one or more accessory systems; and
a fuel cell assembly integrated into the gas turbine engine, the fuel cell assembly comprising a fuel cell group electrically coupled to the power bus and configured to provide a power output, wherein the power output is within an operability range of the designed power load.

16. The aircraft power source of claim 15, wherein the power bus is a DC power bus, and wherein the fuel cell group is directly electrically coupled to the DC power bus without a power converter and the power output has a voltage sized to match a load required by the DC power bus without use of a DC/DC power converter.

17. The aircraft power source of claim 15, wherein the fuel cell assembly comprises fuel cells selected from the group consisting of solid oxide fuel cells, polymer electrolyte membrane fuel cells, direct methanol fuel cells, alkaline fuel cells, phosphoric acid fuel cells, molten carbonate fuel cells, reversible fuel cells, and combinations thereof.

18. The aircraft power source of claim 15, further comprising an alternative power source electrically coupled to the power bus and configured to provide a second power output.

19. The aircraft power source of claim 18, wherein the power bus is a first power bus, wherein the fuel cell group is a first fuel cell group, wherein the alternative power source is a power output from a second power bus, the second power bus electrically coupled to a second fuel cell group, the second fuel cell group configured to provide power to the second power bus.

20. The aircraft power source of claim 19, wherein the first power bus and the second power bus are selectively in direct electrical communications and selectively coupled without a power converter.

21. The aircraft power source of claim 19, wherein the first power bus and the second power bus are selectively in electrical communication with a power converter.

* * * * *